Patented Aug. 10, 1937

2,089,766

UNITED STATES PATENT OFFICE 2,089,766

INSECTICIDE

William A. Simanton, Pittsburgh, Pa., assignor to Gulf Research & Development Company, Pittsburgh, Pa., a corporation of Delaware No Drawing. Application March 7, 1936,
Serial No. 67,734

11 Claims. (Cl. 167—24)

This invention relates to improvements in insecticides and more particularly it relates to an improved insecticidal solution comprising pyrethrins and at least one active toxic ingredient of derris or cubé dissolved in a complex solvent comprising a petroleum fraction and a substance selected from the class consisting of ethylene glycol monoethyl ether acetate and diethylene glycol monoethyl ether acetate; all as more fully hereinafter set forth and as claimed.

Solutions of pyrethrins dissolved in petroleum fractions have long been known and used as insecticides. Such solutions are conventionally prepared by extracting pyrethrum flowers with several times their weight of a petroleum naphtha. Recently it has been discovered that the insecticidal value of such a liquid is materially improved if it also contains, in addition to pyrethrin, other toxic agents of different character. The substances generally recommended as additional toxicants are extracts of derris or cubé made with chloroform, acetone, etc. Sometimes individual constituents of these extracts are isolated in a pure state and so used; isolation being often by crystallization methods. Among the substances isolated and identified are rotenone, deguelin, tephrosin and toxicarol.

The main advantage obtained in using any or all of these ingredients derived from derris and cubé in combination with a solution containing pyrethrins is that the insecticide so derived exhibits a very efficient paralyzing effect when applied to insects and, in addition, it exhibits a very efficient killing action on the insects so paralyzed. In the art to which this invention relates the paralyzing action is familiarly called the "knock down" and the killing effect is called the "kill", these terms having arisen in the application of the standard Peet-Grady method for testing insecticides applied to house flies. In the Peet-Grady method, the percentage of flies paralyzed in a standard period of time is noted and this number taken as the knock down efficiency of the insecticide, while the percentage of flies killed in a standard period of time is noted and this number taken as a measure of the kill efficiency of the insecticide.

Petroleum naphthas containing only dissolved pyrethrins are highly efficient on the basis of knock down, but they are only moderately effective insecticides on the basis of kill. The active toxic ingredients of derris or cubé are known to be efficient killing agents, while in solution they are relatively ineffective on the basis of knock down.

Obviously, an insecticide comprising both pyrethrins and toxic ingredients derived from derris or cubé is better than an insecticide comprising only one of these ingredients, for in combination they impart to an insecticide both high knock down and high kill.

Of the aforementioned ingredients obtainable from derris or cubé neither the pure substances nor the impure extractives containing them are alone sufficiently soluble in petroleum fractions to be incorporated in the most advantageous concentrations, say, between 0.05 and 0.10 per cent of the solution. It is possible to initially dissolve a toxic amount of these substances in an oil, but the resulting solution is an unstable one which precipitates the toxic ingredients on standing. However, incorporation of rotenone or any other active toxic ingredients derived from derris or cubé in a petroleum base insecticide has been facilitated in the past by the use of blending agents of certain kerosene-miscible solvents having relatively good solvent powers for the derris materials.

Among the solvents employed as blending agents in combination with petroleum naphthas are: ethylene dichloride, carbon tetrachloride, acetone, camphor sassafras oil, benzol, and chloroform. These solvents are each and all objectionable for a variety of reasons, chief of which is that their odor is distinctly disagreeable. When incorporated in insecticides, the insecticides become offensive to human beings and this fact has, to a large extent, precluded their widespread use. Most of the above solvents are extremely volatile and the vapors given off from insecticides in which they are incorporated are not only unpleasant, but in some cases toxic to human beings. Substances yielding toxic vapors are benzol and chloroform. Many of the solvents are relatively expensive and their use in commercial insecticides is economically not feasible.

I have discovered that ethylene glycol monoethyl ether acetate and diethylene glycol monoethyl ether acetate are each completely miscible with the petroleum fractions known as naphthas and are also miscible to a more limited extent with higher boiling petroleum fractions. For example, diethylene glycol monoethyl ether acetate is miscible with a petroleum oil having a viscosity of 100 sec. S. U. V. at 100° F. in concentrations up to 5 per cent. With a petroleum oil having a viscosity of 200 sec. S. U. V. at 100° F. the same solvent is miscible in concentrations up to 2 per cent. Ethylene glycol monoethyl ether acetate is completely miscible with both of the above oils. Either ethylene glycol monoethyl ether acetate or diethylene glycol monoethyl ether acetate, if miscible with a petroleum fraction in proportion of 1 per cent or over, will hold in stable solution toxic amounts of derris extractives. Large proportions of either solvent may be easily incorporated by admixture of light naphthas.

I have found that each of these substances is capable of holding rotenone and other extracts of derris and cubé in solution in petroleum fractions in the presence of dissolved pyrethrins. A complex solvent comprising a petroleum fraction and either ethylene glycol monoethyl ether acetate or diethylene glycol monoethyl ether acetate will hold in solution pyrethrins as well as pure rotenone, deguelin, tephrosin, and toxicarol or mixtures containing these substances including relatively crude extracts of derris and cubé. Insecticides prepared by using my complex solvents to dissolve pyrethrins and the active toxic ingredients of derris or cubé are relatively non-volatile, substantially odorless, and have no toxic effect on human beings.

I find that my invention may be advantageously used in the manufacture of insecticidal solutions intended for use as sprays. In one actual embodiment of the invention I prepared such a solution by first forming a 5 per cent solution of crystallin rotenone in diethylene glycol monoethyl ether acetate and then adding one part of this solution to 100 parts of a petroleum naphtha extract of pyrethrum flowers prepared by extracting 1.2 pounds pyrethrum flowers with a deodorized petroleum naphtha. The resulting product was a stable, non-volatile, substantially odorless solution of excellent insecticidal properties. When tested according to the Peet-Grady method the solution repeatedly gave a knock down value of 98 and a kill of 85.

I find that diethylene glycol monoethyl ether acetate is slightly superior to ethylene glycol monoethyl ether acetate as a solvent for the various extracts of derris and cubé, but ethylene glycol monoethyl ether acetate is miscible with the heavier petroleum fractions in larger proportions than is diethylene glycol monoethyl ether acetate. Both compounds are useful.

In another embodiment of the invention I first prepared a crude extract of dry derris roots by extracting the roots with acetone and evaporating off the solvent to yield a resinous mass. I made a 5 per-cent solution of this resinous mass in diethylene glycol monoethyl ether acetate and prepared an insecticidal solution by adding two parts of this 5 per cent solution to 100 parts of a naphtha-pyrethrum extract prepared as before. The resulting insecticidal solution when tested by the Peet-Grady method gave a knock down of 98 and a kill of 88.

Either of the new solvents of my invention is capable of holding 0.05 per cent rotenone or other extracts of derris and cubé in a petroleum base insecticide when as little as 1 per cent is blended with the petroleum oil. Higher percentages will hold greater quantities of derris and cubé extracts in solution. If a derris or cubé extract is to be dissolved in either ethylene glycol monoethyl ether acetate or diethylene glycol monoethyl ether acetate and the resulting solution directly blended with an oil base insecticide, the extract should be present in concentrations not greater than 6 per cent prior to blending or the resulting blend is apt to become unstable and precipitate out the extract on standing.

To be effective as an insecticide, rotenone or other of the derris or cubé extracts mentioned should be present in the finished product in concentrations ranging from .01 to 0.1 per cent by weight.

My invention is also applicable to insecticides other than liquid solutions. For instance, the invention is useful when incorporating rotenone or other extracts of derris and cubé in insecticidal salves. In one such embodiment of my invention, I first blended 5 parts of a concentrated naphtha solution of pyrethrins with one part of ethylene glycol monoethyl ether acetate containing dissolved therein 5 per cent of total extractives prepared by extracting derris with acetone and evaporating off the solvent. I then incorporated this blend with 100 parts of petrolatum by melting the petrolatum, permitting it to cool, and adding the blend while stirring just before the petrolatum became solid. The resulting mixture was a stable odorless insecticide of salve-like homogeneous consistency. This salve is useful for application to the ears of cattle to kill ear ticks.

In the specification and in the appended claims the word "pyrethrins" is used to denote the active insecticidal ingredients of a pyrethrum extract and the expression "active toxic ingredient of derris and cubé" is used to denote any of the pure insecticidal ingredients derived from derris or cubé such as rotenone, deguelin, tephrosin, and toxicarol or impure mixtures including these ingredients such as the total extract obtained by treatment of derris with acetone.

The invention is not to be defined as limited to the foregoing specific embodiments as these are for illustrative purposes only.

What I claim is:

1. An improved insecticide comprising in stable admixture a petroleum fraction, a substance chosen from the class consisting of ethylene glycol monoethyl ether acetate and diethylene glycol monoethyl ether acetate, pyrethrins and at least one of the active toxic ingredients of derris and cubé.

2. An improved insecticidal solution comprising a major proportion of petroleum naphtha and minor proportions of pyrethrins, an active toxic ingredient of derris and cubé and a substance chosen from the class consisting of ethylene glycol monoethyl ether acetate and diethylene glycol monoethyl ether acetate.

3. An improved insecticidal solution comprising 100 parts of a petroleum naphtha extract of pyrethrum flowers, between 1 and 2 parts of a substance chosen from the class consisting of ethylene glycol monoethyl ether acetate and diethylene glycol monoethyl ether acetate and between 0.01 and 0.10 part of an active toxic ingredient of derris and cubé.

4. An improved insecticidal solution comprising approximately 100 parts of a petroleum naphtha solution of pyrethrins, between 1 and 2 parts of diethylene glycol monoethyl ether acetate and between 0.01 and 0.10 part of an active toxic ingredient of derris and cubé.

5. An improved insecticidal solution comprising approximately 100 parts of a petroleum naphtha solution of pyrethrins, 1 part of diethylene glycol monoethyl ether acetate and 0.05 part rotenone.

6. An improved method of preparing insecticides which comprises dissolving pyrethrins and at least one active toxic ingredient of derris and cubé in a complex solvent comprising a petroleum fraction and a substance chosen from the class consisting of ethylene glycol monoethyl ether acetate and diethylene glycol monoethyl ether acetate.

7. An improved method of preparing insecticides which comprises preparing a solution of at least one active toxic ingredient of derris and cubé in diethylene glycol monoethyl ether acetate and bringing said solution into admixture with a petroleum fraction and pyrethrins to form a stable mixture.

8. In the manufacture of stable insecticidal naphtha solutions containing pyrethrins and active toxic ingredients derived from derris and cubé, the step which comprises adding diethylene glycol monoethyl ether acetate to a solution containing said active toxic ingredients to increase the amount which may be held in stable solution in naphtha.

9. An improved method of preparing insecticides which comprises dissolving pyrethrins and at least one active toxic ingredient of derris and cubé in a complex solvent comprising a petroleum fraction and diethylene glycol monoethyl ether acetate.

10. In preparing insecticidal solutions of rotenone in petroleum naphtha, a method of increasing the insecticidal power of the solution which comprises dissolving the rotenone in a solvent selected from the class consisting of ethylene glycol monoethyl ether acetate and diethylene glycol monoethyl ether acetate and mixing said rotenone solution with petroleum naphtha.

11. An improved insecticidal solution comprising a light petroleum distillate and rotenone held in solution therein by an addition of a glycol derivative selected from the class consisting of ethylene glycol monoethyl ether acetate and diethylene glycol monoethyl ether acetate.

WILLIAM A. SIMANTON.